R. V. MATTISON, Jr.
MACHINE FOR ROLLING ASBESTOS CEMENT COMPOSITION.
APPLICATION FILED FEB. 12, 1919.
1,321,384.
Patented Nov. 11, 1919.
3 SHEETS—SHEET 3.
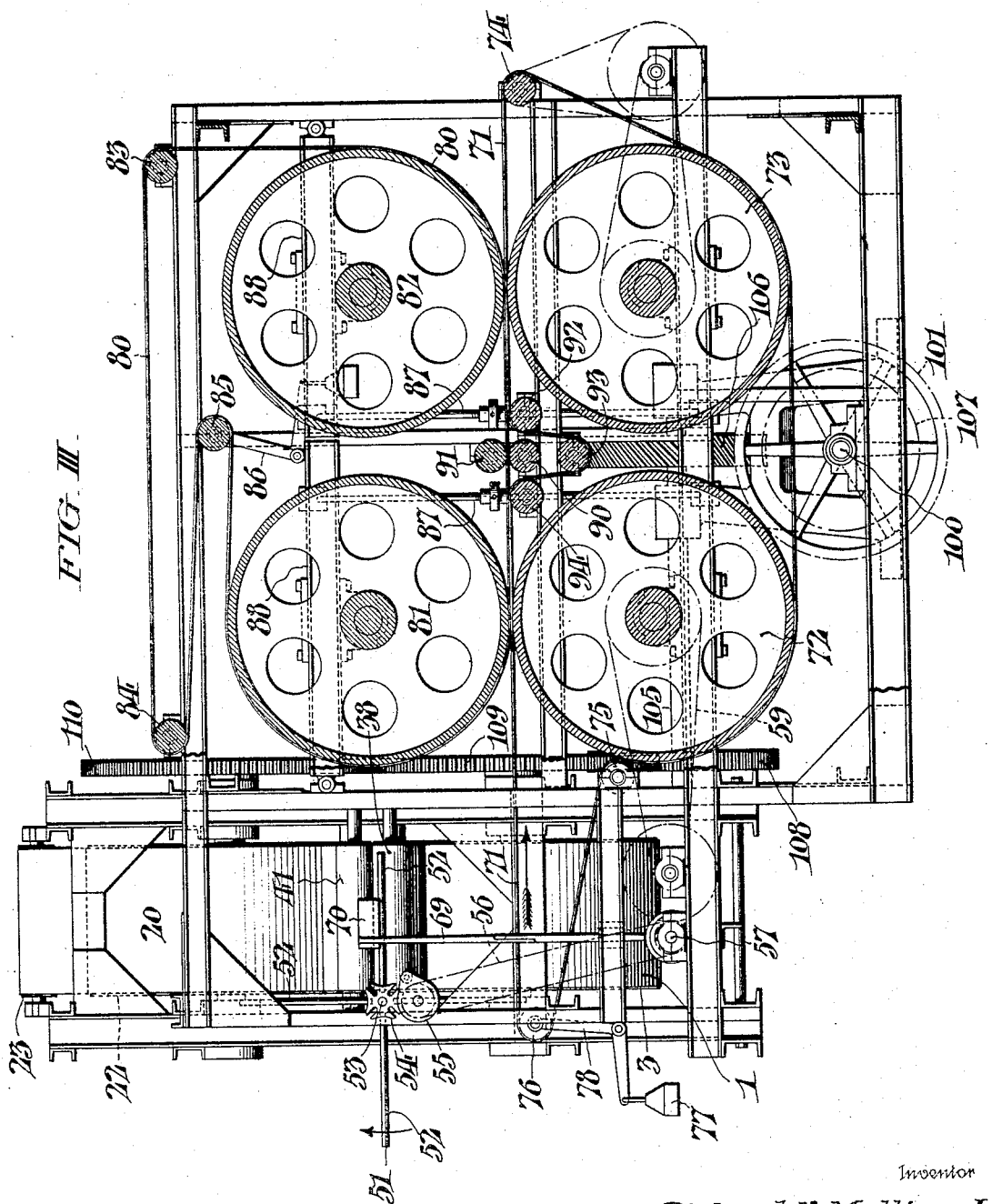

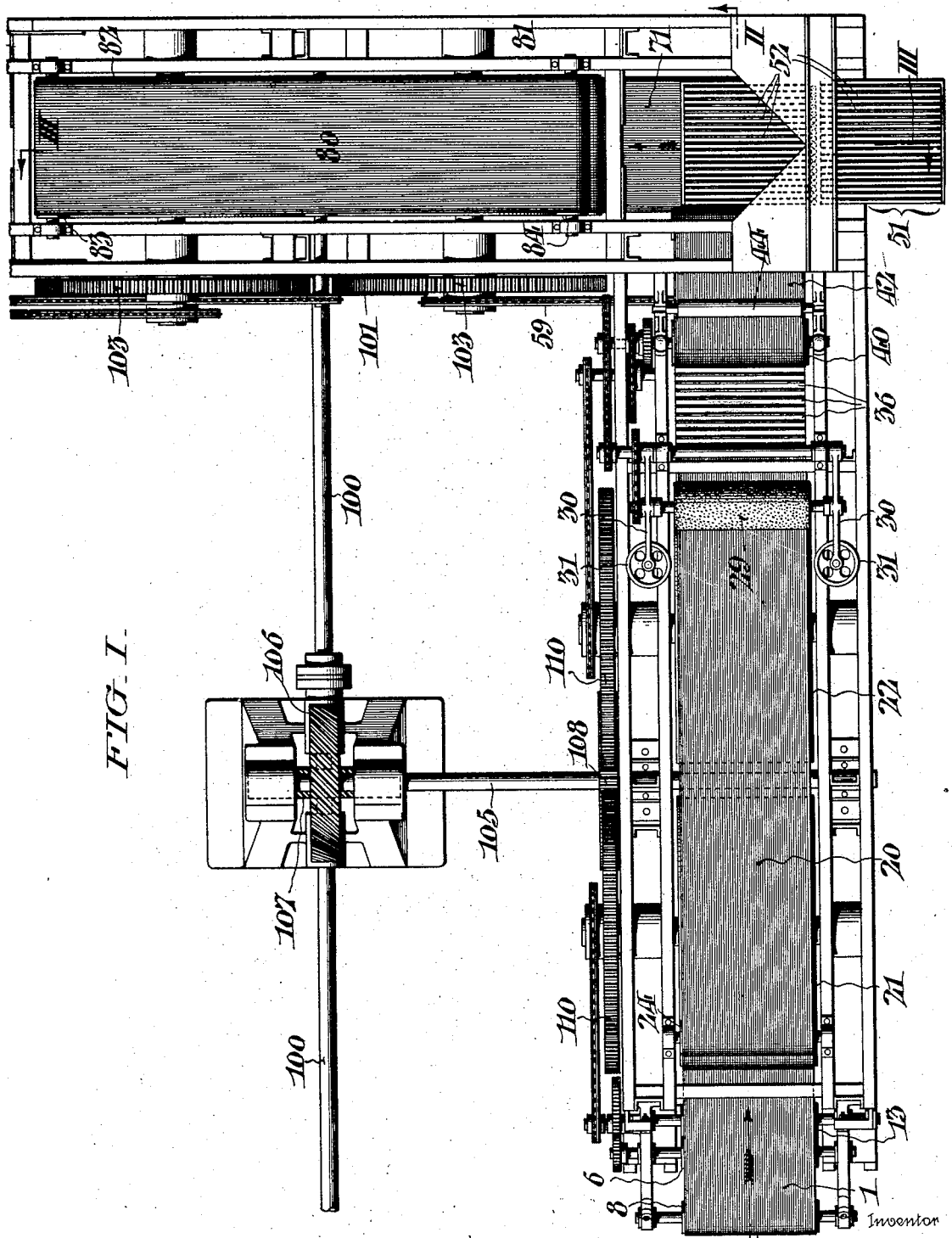

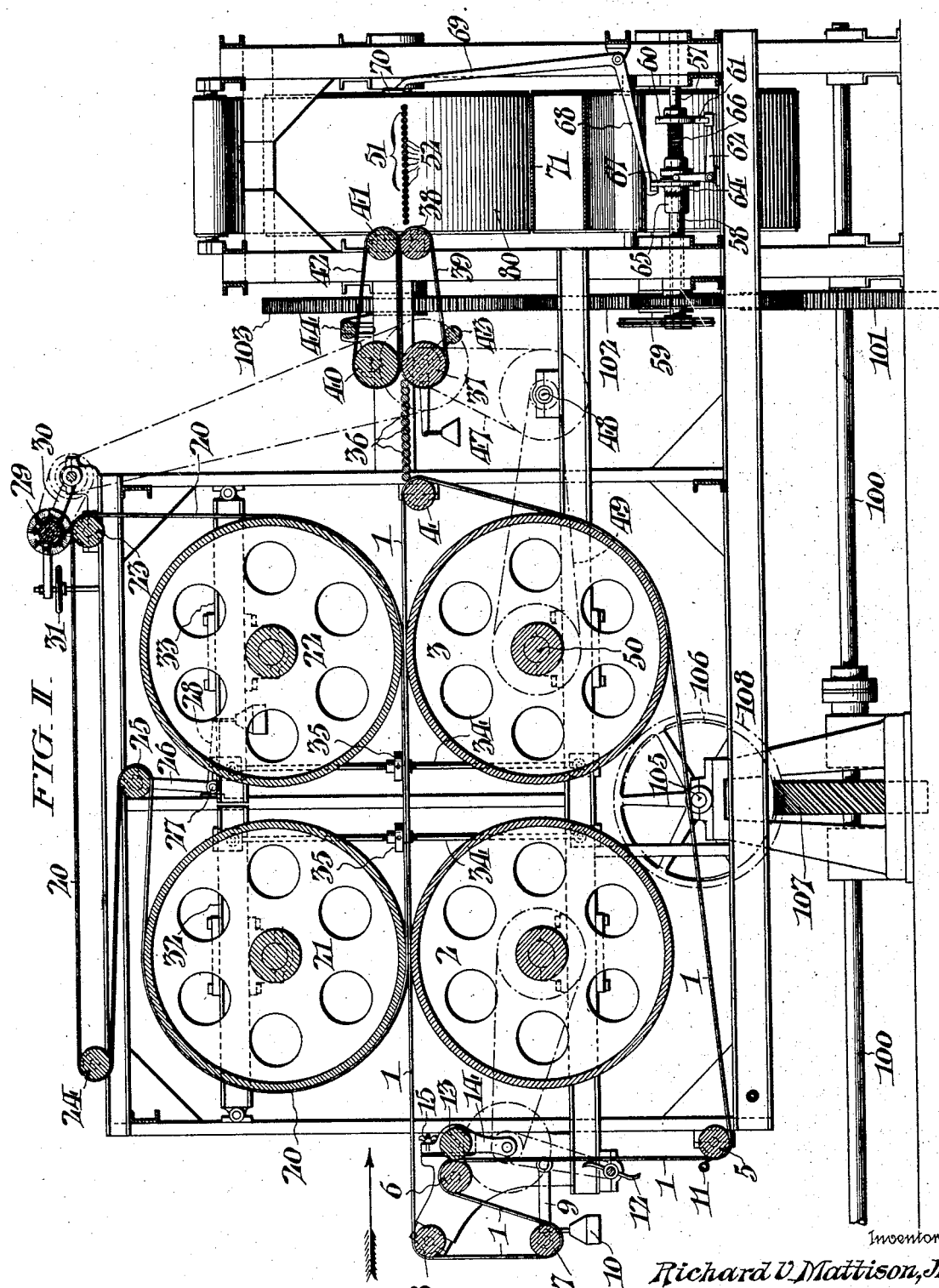

UNITED STATES PATENT OFFICE.

RICHARD V. MATTISON, JR., OF UPPER DUBLIN TOWNSHIP, MONTGOMERY COUNTY, PENNSYLVANIA.

MACHINE FOR ROLLING ASBESTOS-CEMENT COMPOSITION.

1,321,384.  Specification of Letters Patent.  Patented Nov. 11, 1919.

Application filed February 12, 1919. Serial No. 276,682.

*To all whom it may concern:*

Be it known that I, RICHARD V. MATTISON, Jr., a citizen of the United States, residing in Upper Dublin township, in the county of Montgomery and State of Pennsylvania, have invented a certain new and useful Machine for Rolling Asbestos-Cement Composition, of which the following is a specification, reference being had to the accompanying drawings.

My invention relates to rolling mechanism to be employed for drying and compressing flat sections of cement composition such as asbestos cement, in the shape of tiles or shingles. Such asbestos cement composition is usually mixed wet and in this condition may be worked in a pug or auger mill by the employment of a proper nozzle and die. The plastic mixture is extruded from the auger mill in the shape of a flat endless ribbon from which suitably sized sections are successively cut off as by a wire cutter. In order to obtain proper results, it is necessary that these flat asbestos cement sections be rolled under sufficient pressure to remove the surplus moisture which they contain and to properly compress the material before they are allowed to set, and to accomplish this compression properly, it is important that the sections be rolled first in one direction and then in a direction at right angles thereto.

To this end, my invention comprises a set of rolls with endless absorbent aprons by which the first rolling operation is carried on; means for arresting progress of the sections which have been thus rolled in one direction and diverting them to travel successively in a direction at right angles to their first line of travel between a second set of rolls and endless absorbent aprons whereby said sections are again rolled at right angles to the first operation, subsequent to which they are discharged and piled up to dry. Other details which are involved in my invention will become clear as the mechanism is described.

In the accompanying drawings, Figure I, is a plan view of a rolling machine conveniently embodying my invention.

Fig. II, is a longitudinal sectional elevation through the machine indicated by the arrows II—II in Fig. I, showing the side of the first set of rolls and the end of the second set.

Fig. III, is a similar elevation at right angles thereto, indicated by the arrows III—III in Fig. I, showing the side of the second set of rolls, and the end elevation of the first.

Referring first to Fig. II, an endless apron 1, passes over pressure rolls 2, and 3, and thence around idlers 4, 5, the squeeze roll 6, and idlers 7, and 8. The apron is absorbent. It is maintained under suitable tension by mounting the idler 7, upon swinging arms 9, whereby the weight of the idler 7, augmented by a weight 10, exerts the required tension upon the apron. In order to keep the apron clean, its upper surface is exposed to the action of a spray 11, by which any adhering particles of the material on that surface are washed off. The apron is then subjected to a rotating beater 12, which removes a considerable part of the moisture from it. Opposed to the roll 6, is a coöperative squeeze roll 13, mounted on pivoted arms 14, and capable of being brought into compression with the roller 6, by screwing down the arms 14, against the fixed bearings of the roller 6, by means of the wing-nuts 15. The tension between the rollers 6, and 13, is adjusted so as to extract the spray water from the endless belt and restore the same to an absorbent condition for the proper operation of the machine. Associated with the apron 1, is another endless absorbent apron 20, which, after passing under pressure rolls 21, and 22, extends about the idlers 23, 24, and 25, and thence back again around the roll 21. The roll 25, is mounted on arms 26, set on a rock shaft 27, and tension exerted upon the apron 20, by a weighted arm 28. As it passes over the idlers 23, the surface of this absorbent apron 20, is subjected to the cleansing action of a brush 29, mounted on pivoted arms 30, and capable of being set at any desired pressure by the hand wheel 31.

The lower pressure rolls 2, and 3, are set upon fixed bearings suitably housed in the frame of the machine. The upper pressure rolls 21, and 22, are set in bearings carried on beams 32, and 33, pivoted to the frame of the machine, as clearly shown in Fig. II. The free ends of these beams are connected by extension rods 34, with a fixed point of resistance upon the frame of the machine, the length of the extension rod being regulated by the turn buckle 35. In this way, any required degree of tension may be put upon the rolls.

Adjacent to the region of delivery of the apron 1, which is next to the idler 4, is a series of small rollers 36, which receive the rolled sections and pass them on to the accelerating rollers 37 and 38, around which runs the endless belt 39. Opposed to the latter rollers are rollers 40 and 41, associated with endless belt 42. The latter rolls are driven at a rate about fifty per cent. faster than the main rolls which have been described, so as to speed up and separate the rolled sections as they pass therebetween. Slack take-up idlers 43 and 44, keep the aprons 39 and 42, under the required tension.

The shafts of rollers 40, and 41, are in slotted bearings so that said rollers with their belts bear down with their entire weight upon the rolls 37, and 38, with their belt 39. This enables said belts, notwithstanding their faster rotation, to instantly grasp and speed up the rolled sections entering between the rolls 37 and 40. This speeding up action is facilitated by the small rolls 36, which similarly accommodate themselves instantly to the more rapid rotation induced through the pull of the rolls 37 and 40 upon the material. The roller 37, is driven by a sprocket chain 47 from a shaft 48, which, in turn, derives rotation through a sprocket chain 49, from the shaft 50, which carries the pressure roll 3.

In order to check the motion of the sections and to deliver them separately at proper intervals upon a belt provided at right angles to the line of motion which the sections have heretofore traversed, there is provided a turnstile 51, (Fig. III) the arms of which successively receive the sheets of material from the first section of the machine which has just been described and delivers them to the second section where they are again rolled at right angles to the first rolling. This turnstile consists of a four-armed spider each arm of which carries a series of aluminum rollers 52. These rollers are free to turn upon their axes at right angles to the axis of the turnstile. This enables the rollers to turn under the sheets as they are pushed sidewise onto one of the arms of the turnstile from the delivery end of the accelerating rolls and aprons. The outer end of the turnstile shaft 53, projects through a fixed bearing and carries upon its extension a slotted disk 54, of a Geneva stop mechanism, coöperative with a single roller driving disk 55, actuated by a sprocket chain 56; from the intermittently driven clutch shaft 57. Mounted upon the shaft 57, is a continuously rotating sleeve 58, driven through interposed gearing by a sprocket chain 59, from the shaft of the large rolls shown in Fig. III, which will be described later.

The clutch shaft 57, carries a disk 60, on the perimeter of which is formed the cam 61, which is capable of acting upon a roller on the horizontal arm of bell crank lever 62, the upright arm of which engages the sliding jam 64, of the clutch, the opposing portion 65, of the clutch being set upon the constantly rotating sleeve 58. This sliding portion of the clutch is normally pressed into engagement with its fellow portion by the spiral spring 66, unless disengaged therefrom by the action of the cam 61, upon the bell crank lever. When thus disengaged, the disk 67, which is integral with the sliding portion 64, of the clutch, comes into engagement with the hooked end of a long armed lever 68, the other arm 69, of which carries at its extremity a stop or buffer 70, in position to be struck by a rolled section passing upon one of the arms of the turnstile. By the co-action of these parts, the turnstile is held immovable with one of its arms directly horizontal in position to receive a rolled section from thte accelerating aprons 39, and 42, upon the edge of this section coming in contact with the buffer 70, the hook of the arm 68 is disengaged from the movable clutch member, permitting the clutch portions to engage, whereupon the Geneva motion which has rested in the position shown in Fig. III, begins to operate immediately, thereby giving to the turnstile an instantaneous quarter rotation.

After this has been accomplished the action of the cam 61, effects intermission of the motion of the turnstile until another section of material has been received upon the succeeding arm. In the meanwhile, however, the rapid downward motion of the first - mentioned arm of the turnstile has permitted the rolled section to drop vertically upon the apron 71, of the second set of rolling elements.

This section of the machine is substantially identical with the first described rolling section, and may be briefly described as follows:

Apron 71 passes about the lower pressure rolls 72 and 73, its path being otherwise determined through the assistance of the idler rolls 74, 75 and 76. A constant tension is maintained upon said apron by a weight 77, effective upon arms 78, by which the roll 76 is supported. The upper absorbent apron 80, passes about the pressure rolls 81 and 82, and is similarly obliged to follow the course determined by the idlers 83, 84 and 85, of which the latter serves as a slack take-up under the action of a weighted lever 86, in a manner already well understood.

In this instance, the lower pressure rolls 13

72 and 73 are also journaled in fixed bearings of the frame of the machine while the upper pressure rolls 81 and 82 are relatively adjustable in order to permit regulation of the desired pressure, by varying the length of the tie rods 87—87, effective upon the pivoted beams 88—88, which support the bearings of the said rolls.

This section of the machine is preferably provided with a means for printing the sheets of the material during their progression therethrough. This printing mechanism includes a type roll 90, which is opposed by a roll 91 serving as a platen. In order to accommodate the type roll, the lower absorbent apron 71, is caused to deviate from the generally straight path through the assistance of the guide rolls 92, 93 and 94.

The moving elements of the machine derive their motion from a main shaft 100, which carries a master gear 101, (Fig. III), common to the gears 102—102 (Fig. II) by which the lower rolls 72 and 73, of the secondary rolling section of the machine, are driven. Motion is in turn transmitted to the upper rolls 81 and 82 of this section by gears 103—103 (Fig. I) which respectively mesh with the gears 102—102. The primary rolling section is driven in a similar manner through a shaft 105, having a spiral gear 106, meshing with a similar gear 107, on the main shaft 100. Shaft 105, also carries a master gear 108 (Fig. III), which is common to the gears 109—109 by which the lower pressure rolls 2 and 3 are driven. The upper pressure rolls 21 and 22 are in turn driven through gears 110—110 (Fig. I), meshing with the gears 109—109 respectively.

In operation, the severed sheets of the cement material are fed upon the extended portion of the apron 1, at the left hand end of Fig. II, and advanced in the direction of the arrow between the coöperating pressure rolls 2—3 and 21—22, whereby the excess water is extracted and absorbed by the aprons 1 and 20, such absorbed water being subsequently removed from the belts during each circuit through the instrumentalities previously described. After progression through this portion of the machine, the sheets are successively transferred to the turnstile, being guided thereto by the accelerating belts 39 and 42. As the sheets are received on the said turnstile, they individually cause the operation of the latter by contact with the lever which controls the clutch determining the behavior of the Geneva movement by which the turnstile is actuated.

The speed of the accelerating belts and the action of the turnstile are so related to that of the aprons 1 and 20, that a sufficient time interval is afforded for the individual transfer of the sheets to the apron 70, of the secondary rolling section of the machine. The instantaneous movement of the turnstile afforded through the drive of the Geneva movement permits the sheets to drop flat upon the apron 71, without any danger whatever of distortion or rupture.

After such transfer, the sheets are progressed through the secondary rolling section of the machine in a manner obvious in view of the described operation of the primary section. It is to be noted, however, that the sheets, during their traverse through the secondary rolling section, receive an imprint through the contact of the type roll.

After this double rolling, the sheets may be collected for storage or first conveyed to suitable devices for coloring if desired.

Having thus described my invention, I claim:

1. A machine of the class described, consisting of means for rolling cement materials in sheet form in one direction; a second means for rolling the same in a direction at right angles to that of the first rolling means; in combination with means for transferring the sheets from one to the other of said rolling means.

2. Mechanism for rolling rectangular sheets of cement composition comprising two sets of endless belts with pressure rolls running at related speeds and at right angles to each other; and transfer mechanism, including means whereby each sheet, after passing through the first set of rolls, is stopped and dropped upon the endless belts of the second set of rolls.

3. A machine of the class described, consisting of means for rolling cement materials in sheet form in one direction; a second means for rolling the same in a direction at right angles to that of the first rolling means; in combination with means for transferring the sheets from one to the other of said rolling means, said transfer means including a turnstile; and means whereby each sheet as it is received upon the turnstile automatically sets said turnstile into motion to effect the transfer.

4. A machine of the class described, consisting of means for rolling cement materials in sheet form in one direction; a second means for rolling the same in a direction at right angles to that of the first rolling means; in combination with means for transferring the sheets from one to the other of said rolling means; said transfer means including a turnstile; a clutch controlled means for intermittently operating said turnstile; and means actuated by each individual sheet for controlling said clutch to set said turnstile in motion to effect the transfer.

5. A machine of the class described, consisting of means for rolling cement materials in sheet form in one direction; a second means for rolling the same in a direction at right angles to that of the first rolling means; in combination with means for transferring the sheets from one to the other of said rolling means, said transfer means, including a turnstile, consisting of a multi-arm spider, each arm adapted to receive a sheet in the order of its succession; instantaneous means for causing intermittent partial rotation of said turnstile; a stop for arresting the sheets as they are successively received upon the arms of said turnstile; a clutch controlled by said stop whereby the actuating means for the turnstile is automatically set in motion upon the reception of each sheet.

6. A machine of the class described, consisting of means for rolling cement materials in sheet form in one direction; a second means for rolling the same in a direction at right angles to that of the first rolling means; in combination with means for transferring the sheets from one to the other of said rolling means; accelerating means interposed between the said first rolling means and the transfer means whereby the speed of the sheets is increased to afford the necessary time interval for the operation of the transfer means.

7. A machine of the class described, consisting of a primary and secondary rolling means, operative at right angles to each other, and each including paired endless absorbent aprons in opposed relation, adapted to receive there-between materials in sheet form; pressure rolls associated with each of said aprons; means for varying the pressure exerted by said rollers in combination with means for transferring the sheets in succession from one of said rolling means to the other.

8. A machine of the class described, including in combination endless absorbent aprons in opposed relation, adapted to receive there-between materials in sheet form; a set of pressure rolls associated with each apron; fixed bearings for one set of pressure rollers; means for relatively adjusting the other set of pressure rolls, including bearings for said rolls; pivoted beams supporting said bearings; and adjustable tie rods, operating upon said beams.

In testimony whereof I have hereunto signed my name at Philadelphia, Pennsylvania, this tenth day of February, 1919.

RICHARD V. MATTISON, JR.

Witnesses:
JAMES H. BELL,
E. L. FULLERTON.